M. MATTSON.
Method of Finishing Hard Rubber Trimmings.
No. 213,581.          Patented Mar. 25, 1879.
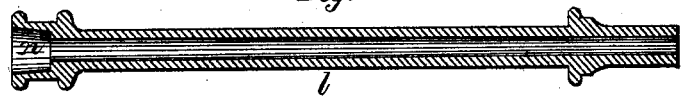
Fig. 1.
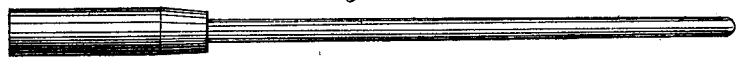
Fig. 2.
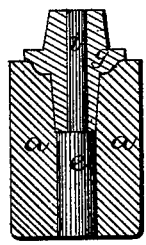
Fig. 3.
Fig. 5.          Fig. 4.          Fig. 6.
 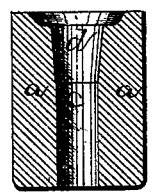 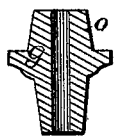
Witnesses:
J. W. Garner
W. S. D. Haines
Inventor:
Morris Mattson,
per
F. A. Lehmann,
atty.

UNITED STATES PATENT OFFICE.

MORRIS MATTSON, OF NEW YORK, N. Y.

IMPROVEMENT IN METHODS OF FINISHING HARD-RUBBER TRIMMINGS.

Specification forming part of Letters Patent No. 213,581, dated March 25, 1879; application filed February 15, 1879.

*To all whom it may concern:*

Be it known that I, MORRIS MATTSON, of New York, in the county of New York and State of New York, have invented certain new and useful Improvements in Methods of Finishing Hard-Rubber Trimmings; and I do hereby declare the following to be a full, clear, and exact description of the invention, such as will enable others skilled in the art to which it pertains to make and use it, reference being had to the accompanying drawings, which form part of this specification.

My invention relates to an improvement in the method of finishing hard rubber and analogous substances capable of being molded for use in syringes, breast-pumps, and other such articles; and it consists in first forming the tubes or plugs in the usual molds or formers, and then either forcing a steel die into the ends of the tubes, where a connective cavity is to be formed, or forcing the plugs which are to fit the connective cavities into a steel die, whereby the surface of the rubber is condensed and perfectly finished, assuming at the same time the exact size and taper required for accurate fitting.

By this method of finishing two important objects are gained—celerity and cheapness in the works and absolute accuracy in all of the fitting parts—as will be more fully described hereinafter.

In the accompanying drawings are shown the dies and pieces of hard rubber finished by my method.

*a* represents a metallic die, preferably of steel, having a hole, *c*, all the way through its center, and a recess, *d*, of suitable shape and form in its top. Through the center of this die is passed the rod *e*, of two different sizes, the smaller end of which passed through the hole in the center of the hard-rubber plug *g*, so as to keep the hole from being reduced in diameter while the plug is being pressed in the die.

This plug may be first molded into shape in what is called a "former," and there vulcanized in the former; or it may be roughly formed on a metallic core without the aid of a former, and vulcanized in soap-stone. After this it is heated and softened in any convenient manner, and the end *i* is driven into the hole *d* in the die *a*.

By thus forcing the plug into the die the outer surface is rendered beautifully smooth, compact, and of a definite or unvarying size. This process is speedy and effective, and greatly preferable to the slow process of forming the plug upon a lathe, in which it is difficult in making a number of plugs to have them all of an exact size.

The end *o* may have a screw-thread cut upon it, if so required, which may be preferable in securing the valve of a syringe or analogous instrument in its proper place.

The connective cavities of hard-rubber induction or eduction tubes are formed by pressing into them a suitable die, to be presently described.

An induction-tube is shown at *l*, which has been first molded in a metallic former, and then vulcanized in the former with the core still in the interior, so as to form the hole through its center. After vulcanization, while the rubber is still warm, the core may be easily withdrawn, when the cavity at *n* will be found to slightly contract. After this the tube is softened slightly by exposure to heat, and then a polished steel die is forced into the cavity *n*, which solidifies the rubber and produces an exceedingly smooth and finished surface.

Of course the taper of the cavity *n* and the taper of the plug will be the same; otherwise a perfect joint will not be produced.

By this method the connective surfaces are finished at once, so as to need no finishing upon the lathe or other manipulation, and an invariable size is given to each cavity.

Having thus described my invention, I claim—

The method herein described of finishing the connecting-surfaces of hard-rubber articles, consisting in first slightly softening them, and then making use of dies, substantially as shown.

In testimony that I claim the foregoing I have hereunto set my hand this 11th day of February, 1879.

M. MATTSON.

Witnesses:
H. C. BURTON,
WM. H. SLOAN.